(12) United States Patent
Lee et al.

(10) Patent No.: US 12,189,898 B2
(45) Date of Patent: Jan. 7, 2025

(54) TOUCH SENSING SYSTEM AND DRIVING METHOD THEREOF

(71) Applicant: LG DISPLAY CO., LTD., Seoul (KR)

(72) Inventors: Young Joon Lee, Paju-si (KR); Sang Hyuck Bae, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/384,590

(22) Filed: Oct. 27, 2023

(65) Prior Publication Data
US 2024/0256086 A1 Aug. 1, 2024

(30) Foreign Application Priority Data
Jan. 26, 2023 (KR) .......................... 10-2023-0009972

(51) Int. Cl.
G06F 3/041 (2006.01)
G06F 3/0354 (2013.01)
G06F 3/044 (2006.01)

(52) U.S. Cl.
CPC ...... G06F 3/04184 (2019.05); G06F 3/03545 (2013.01); G06F 3/04162 (2019.05); G06F 3/044 (2013.01); G06F 2203/04107 (2013.01)

(58) Field of Classification Search
CPC ............. G06F 3/04184; G06F 3/04162; G06F 3/03545; G06F 3/044; G06F 2203/04107; G06F 3/0443; G06F 3/0442
See application file for complete search history.

(56) References Cited

U.S. PATENT DOCUMENTS

| | | | | |
|---|---|---|---|---|
| 2019/0179475 | A1* | 6/2019 | Seo | ........................ G06F 3/0442 |
| 2020/0210021 | A1* | 7/2020 | Ju | ........................ G06F 3/04162 |
| 2020/0401293 | A1* | 12/2020 | Wang | ..................... G06F 3/0443 |
| 2024/0028160 | A1* | 1/2024 | Jang | ..................... G06F 3/04184 |

* cited by examiner

*Primary Examiner* — Abdul-Samad A Adediran
(74) *Attorney, Agent, or Firm* — Morgan, Lewis & Bockius LLP

(57) ABSTRACT

A touch sensing system may include, for example, pixels for displaying an input image, data lines, touch electrodes, a timing controller for dividing one frame into a display driving period for displaying the input image and a touch driving period for driving the touch electrodes, a stylus pen for receiving a pen uplink signal during the touch driving period and outputting a pen downlink signal, and a touch sensing circuit for causing the pen uplink signal to be radiated to the stylus pen from the data lines during the touch driving period and for sensing voltages of the touch electrodes based on the pen downlink signal. In another example, a touch sensing system may supply the pen uplink signal, which is to be radiated to the stylus pen, using touch electrodes and reference voltage lines during the touch driving period. Methods of driving a touch sensing system are also disclosed.

15 Claims, 15 Drawing Sheets

TOUCH SENSING SYSTEM AND DRIVING METHOD THEREOF

CROSS-REFERENCE TO RELATED APPLICATIONS

This application claims the benefit of and priority to Korean Patent Application No. 10-2023-0009972 filed on Jan. 26, 2023, the entirety of which is incorporated herein by reference for all purposes as if fully set forth herein.

BACKGROUND

1. Technical Field

The present disclosure relates to a touch sensing system and a driving method thereof.

2. Discussion of the Related Art

In display apparatuses including a capacitance-type touch sensor, a stylus pen is being mainly used as a human interface device (HID). The stylus pen has the advantage of being able to input more precisely than a finger. The stylus pen generates a pen downlink signal on the basis of a pen uplink signal received from a display apparatus and apply the pen downlink signal to a touch electrode to drive a touch sensor. Therefore, a touch sensing circuit of the display apparatus senses a voltage variation of the touch sensor.

The pen uplink signal is radiated using the touch electrode of the display apparatus and is transmitted to the stylus pen. At the same time, because the touch electrode overlaps electrode lines for display driving, a large parasitic capacitance is present therebetween. Therefore, when the pen uplink signal is radiated using the touch electrode, the pen uplink signal may be distorted due to a resistor-capacitor (RC) delay at the touch electrode. When the pen uplink signal is distorted, the stylus pen may not recognize the pen uplink signal. Consequently, it may become unfeasible to carry out a pen operation.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

To obviate one or more problems due to limitations and disadvantages of the related art, one or more aspects of the present disclosure may provide a touch sensing system and a driving method thereof, which may reduce the distortion of a pen uplink signal to enhance pen touch performance.

To achieve these objects and other advantages of the disclosure, as embodied and broadly described herein, in one or more example embodiments, a touch sensing system may include a display panel having a plurality of pixels displaying an input image, data lines each of which is for supplying a respective one of the plurality of pixels with a data voltage corresponding to a gray level of the input image, and touch electrodes disposed to overlap the plurality of pixels. The touch sensing system may further include a timing controller configured to temporally divide one frame into a display driving period for displaying the input image and a touch driving period for driving the touch electrodes, a stylus pen configured to receive a pen uplink signal during the touch driving period and output a pen downlink signal synchronized with the pen uplink signal, and a touch sensing circuit configured to perform control so that the pen uplink signal is radiated to the stylus pen from the data lines during the touch driving period and sense voltages of the touch electrodes based on the pen downlink signal.

A touch sensing system according to one or more example embodiments of the present disclosure may include a display panel having a plurality of pixels displaying an input image, data lines each of which is for supplying a respective one of the plurality of pixels with a data voltage corresponding to a gray level of the input image, reference voltage lines for supplying a reference voltage to the plurality of pixels, and touch electrodes disposed to overlap the plurality of pixels. The touch sensing system may further include a timing controller configured to temporally divide one frame into a display driving period for displaying the input image and a touch driving period for driving the touch electrodes, a stylus pen configured to receive a pen uplink signal during the touch driving period and output a pen downlink signal synchronized with the pen uplink signal, and a touch sensing circuit configured to supply the pen uplink signal, which is to be radiated to the stylus pen, to the touch electrodes and the reference voltage lines during the touch driving period and sense voltages of the touch electrodes based on the pen downlink signal.

One or more example aspects of the present disclosure may provide a driving method of a touch sensing system including a display panel, where the display panel may include a plurality of pixels displaying an input image, data lines each of which is for supplying a respective one of the plurality of pixels with a data voltage corresponding to a gray level of the input image, and touch electrodes disposed to overlap the plurality of pixels. The driving method may include temporally dividing one frame into a display driving period for displaying the input image and a touch driving period for driving the touch electrodes, performing control by using a touch sensing circuit so that a pen uplink signal is radiated to a stylus pen from the data lines during the touch driving period, receiving the pen uplink signal by using the stylus pen during the touch driving period and outputting a pen downlink signal synchronized with the pen uplink signal, and sensing voltages of the touch electrodes based on the pen downlink signal by using the touch sensing circuit during the touch driving period.

One or more example aspects of the present disclosure may provide a driving method of a touch sensing system including a display panel, where the display panel may include a plurality of pixels displaying an input image, data lines each of which is for supplying a respective one of the plurality of pixels with a data voltage corresponding to a gray level of the input image, reference voltage lines for supplying a reference voltage to the plurality of pixels, and touch electrodes disposed to overlap the plurality of pixels. The driving method may include temporally dividing one frame into a display driving period for displaying the input image and a touch driving period for driving the touch electrodes, supplying a pen uplink signal, which is to be radiated to the stylus pen, to the touch electrodes and the reference voltage lines by using a touch sensing circuit during the touch driving period, receiving the pen uplink signal by using the stylus pen during the touch driving period and outputting a pen downlink signal synchronized with the pen uplink signal, and sensing voltages of the touch electrodes based on the pen downlink signal by using the touch sensing circuit during the touch driving period.

Other systems, methods, features and advantages will be, or will become, apparent to one with skill in the art upon examination of the drawings and detailed description herein. It is intended that all such systems, methods, features and advantages be included within this description, be within the scope of the present disclosure, and be protected by the following claims. Nothing in this section should be taken as a limitation on the claims. Further aspects and advantages are discussed below in conjunction with embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles of the disclosure. In the drawings.

Figure 1:
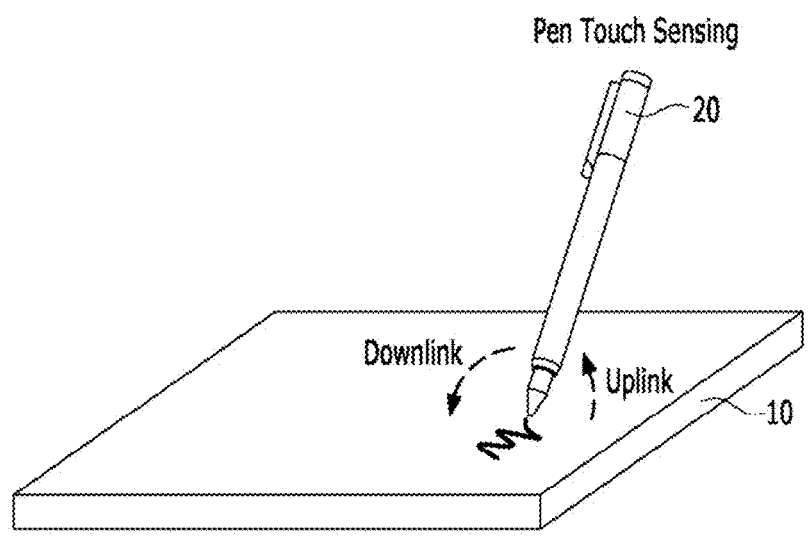
FIG. 1 is a diagram illustrating a touch sensing system according to a present example embodiment.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure. Further, the present disclosure is defined by the scope of claims and their equivalents.

Shapes, dimensions (e.g., sizes, lengths, widths, heights, thicknesses, locations, radii, diameters, and areas), ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements, one or more other elements may be added unless a term such as "only" or the like is used. The terms used in the present disclosure are merely used in order to describe particular example embodiments, and are not intended to limit the scope of the present disclosure. The terms of a singular form may include plural forms unless the context clearly indicates otherwise. The word "exemplary" is used to mean serving as an example or illustration. Embodiments are example embodiments. Aspects are example aspects. "Embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, where the positional relationship between two elements (e.g., layers, films, regions, components, sections, or the like) is described, for example, using "on," "upon," "on top of," "over," "under," "above," "below," "beneath," "near," "close to," "adjacent to," "beside," "next to," "at or on a side of" or the like, one or more other elements may be located between the two elements unless a more limiting term, such as "immediate(ly)," "direct(ly)," or "close(ly)," is used. For example, when an element is described as being positioned "on," "on a top of," "upon," "on top of," "over," "under," "above," "below," "beneath," "near," "close to," "adjacent to," "beside," "next to," or "at or on a side of" another element, this description should be construed as including a case in which the elements contact each other directly as well as a case in which one or more additional elements are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., layers, films, regions, components, sections, or the like), these elements should not be limited by these terms, for example, to any particular order, precedence, or number of elements. These terms are used only to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phrase "through" may be understood to be at least partially through or entirely through. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item. Further, at least one of a plurality of elements can represent (i) one element of the plurality of elements, (ii) some elements of the plurality of elements, or (iii) all elements of the plurality of elements. Further, one or more of a plurality of elements can represent (i) one element of the plurality of elements, (ii) some elements of the plurality of elements, or (iii) all elements of the plurality of elements. Further, some (or at least some) of the plurality of elements can represent (i) one element of the plurality of elements, (ii) more than one element of the plurality of elements, or (iii) all elements of the plurality of elements.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements.

In one or more examples, the number of elements may be two. In one or more examples, the number of elements may be more than two. Furthermore, when an element (e.g., layer, film, region, component, section, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

In description of flow of a signal, for example, when a signal is provided from a first component to a second component, this may include a case where the signal is transferred from the first component to the second component via one or more components unless a phrase such as "immediately transferred," "directly transferred" or the like is used.

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

FIG. 1 is a diagram illustrating a touch sensing system according to the present example embodiment.

Referring to FIG. 1, the touch sensing system according to the present example embodiment may include a display apparatus 10 and a stylus pen 20.

The display apparatus 10 may be implemented to enable a display function and a touch sensing function. The display apparatus 10 may include capacitance-type touch sensors provided therein, so as to enable touch sensing based on a contact by a conductive object such as a finger or the stylus pen 20. Here, the touch sensors may be configured as an independent type with respect to a display panel, or may be embedded in a pixel array of the display panel.

The stylus pen 20 may generate a pen downlink signal in synchronization with a pen uplink signal received from the display apparatus 10 and may output the pen downlink signal to a contact point between the stylus pen 20 and the display apparatus 10, and thus, may input a pen touch through (or from or using) a screen of the display apparatus 10.

Figure 2:
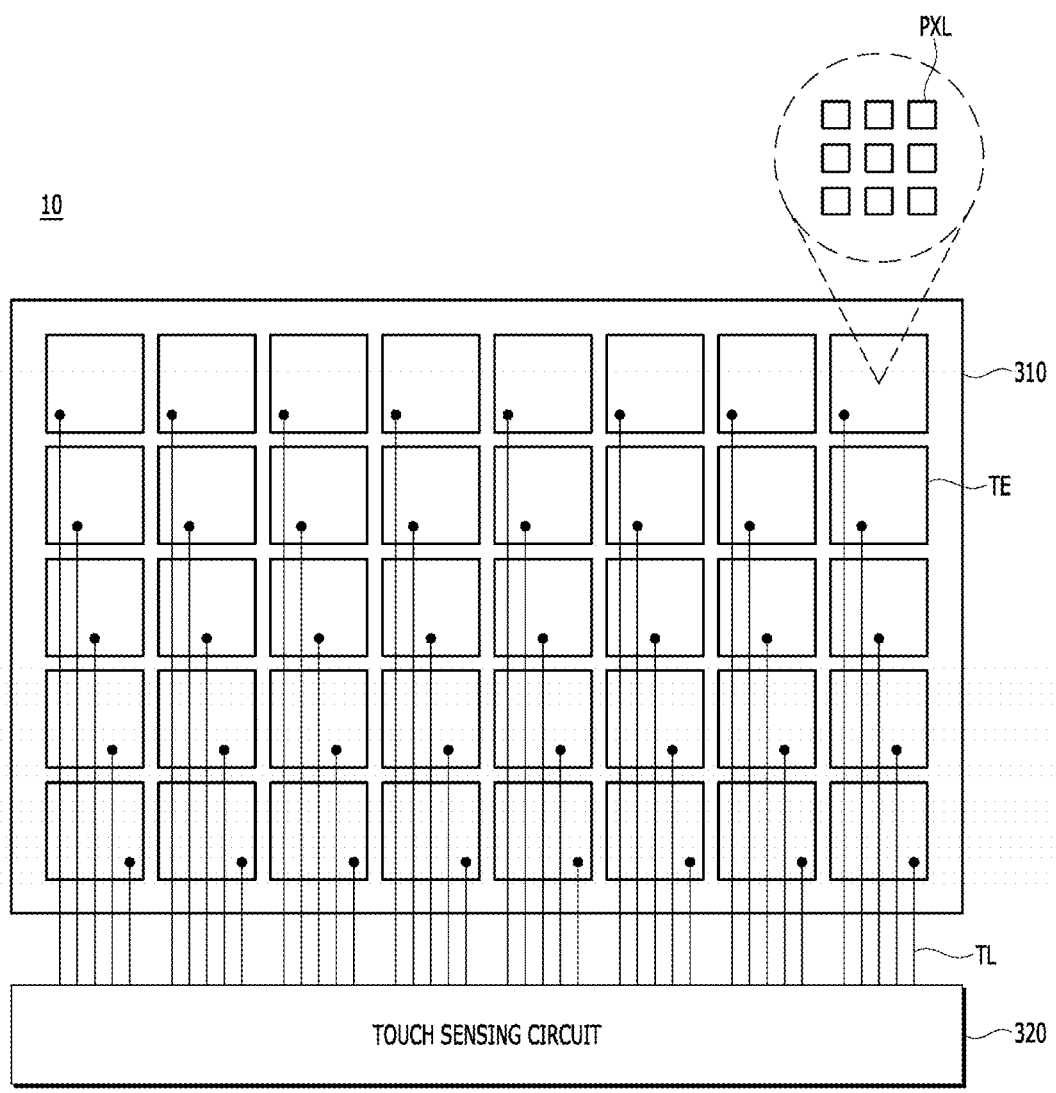
FIG. 2 is a diagram illustrating an example of a connection configuration between touch electrodes and a touch sensing circuit in a display apparatus.
Figure 3:
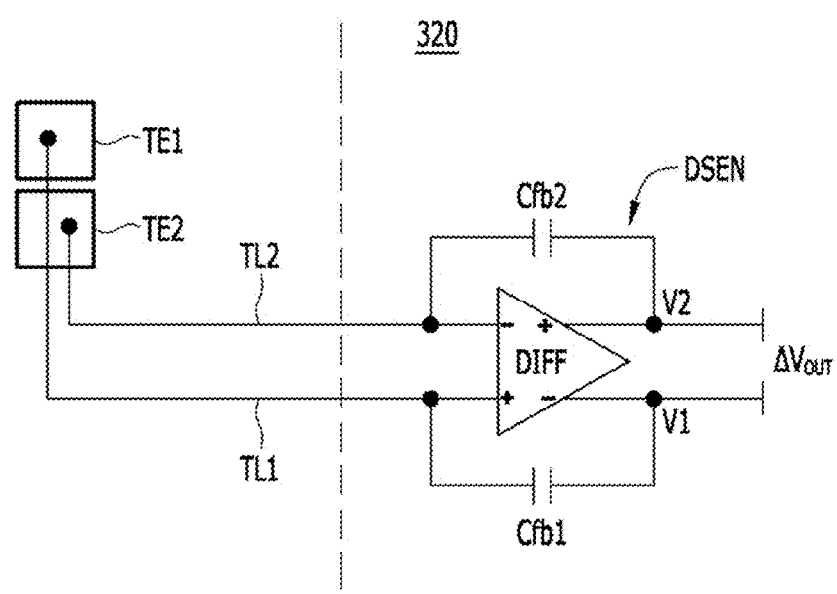
FIG. 3 is a diagram illustrating an example of a configuration of a differential sensing circuit included in the touch sensing circuit.

FIG. 2 is a diagram illustrating an example of a connection configuration between touch electrodes and a touch sensing circuit in the display apparatus 10. FIG. 3 is a diagram illustrating an example of a configuration of a differential sensing circuit included in the touch sensing circuit.

Referring to FIG. 2, the display apparatus 10 according to the present example embodiment may be an apparatus which displays an input image and performs pen touch processing in cooperation with the stylus pen 20 and may include a display panel 310 and a touch sensing circuit 320.

A plurality of touch electrodes TE may be disposed in the display panel 310, and a plurality of touch lines TL electrically connecting the plurality of touch electrodes TE to the touch sensing circuit 320 may be disposed in the display panel 310.

The touch electrodes TE may configure touch sensors as a capacitance type. A capacitance may be categorized into a self-capacitance and a mutual capacitance. The self-capacitance may be formed along a single-layer conductor line formed in one direction, and the mutual capacitance may be formed between two conductor lines perpendicular to each other. The touch electrodes TE may be embedded in the pixel array of the display panel 310. Pixels PXL for displaying an input image may be provided in the pixel array. In the pixel array, the touch electrode TE may overlap a plurality of pixels PXL.

The touch sensing circuit 320 may be electrically connected to the touch electrodes TE through (or using) the touch lines TL. When the pen downlink signal is applied from the stylus pen 20 to the touch electrodes TE, the touch sensing circuit 320 may sense voltages of the touch electrodes TE. The touch sensing circuit 320 may analyze voltage variations of the touch electrodes TE to recognize pen additional information and a touch input position by the stylus pen 20. The pen additional information may include pen pressure information representing pressure of the stylus pen 20 when the stylus pen 20 contacts a screen of the display apparatus 10, button information representing whether a functional button included in the stylus pen 20 is activated, and pen identification information.

The touch sensing circuit 320 may include a plurality of differential sensing circuits DSEN, an example of which is illustrated in FIG. 3. The differential sensing circuit DSEN may be simultaneously connected to touch electrodes TE1 and TE2 and may output a voltage difference $\Delta V_{OUT}$ between the touch electrodes TEL and TE2 as a sensing result. The differential sensing circuit DSEN may include a differential amplifier DIFF and feedback capacitors Cfb1 and Cfb2. A positive (+) input terminal of the differential amplifier DIFF may be connected to a first touch electrode TE1 through a first touch line TL1, and a negative (−) input terminal of the differential amplifier DIFF may be connected to a second touch electrode TE2 through a second touch line TL2. A first feedback capacitor Cfb1 may be connected between the positive (+) input terminal and a negative (−) output terminal of the differential amplifier DIFF, and a second feedback capacitor Cfb2 may be connected between the negative (−) input terminal and a positive (+) output terminal of the differential amplifier DIFF. A sensing voltage V1 of the first touch electrode TE1 may be output to the negative (−) output terminal of the differential amplifier DIFF, and a sensing voltage V2 of the second touch electrode TE2 may be output to the positive (+) output terminal of the differential amplifier DIFF. A final output voltage $\Delta V_{OUT}$ of the differential amplifier DIFF may be a difference voltage between the sensing voltages V1 and V2. The final output voltage $\Delta V_{OUT}$ of the differential amplifier DIFF may be relatively high when there is a touch input applied to one of the touch electrodes TE1 and TE2. On the other hand, the final output voltage $\Delta V_{OUT}$ of the differential amplifier DIFF may be relatively low when there is no touch input applied to one of the touch electrodes TE1 and TE2.

Figure 4:
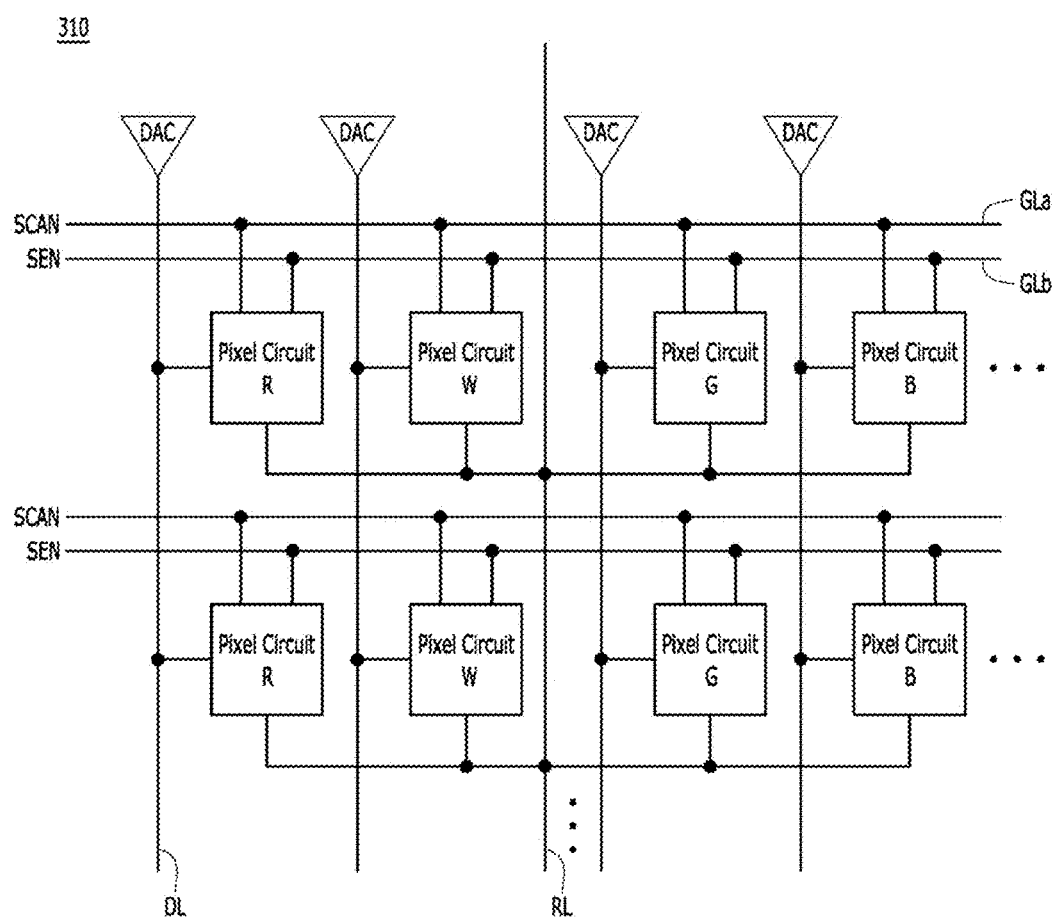
FIGS. 4 and 5 are diagrams illustrating an example of a pixel circuit included in the display apparatus.
Figure 5:
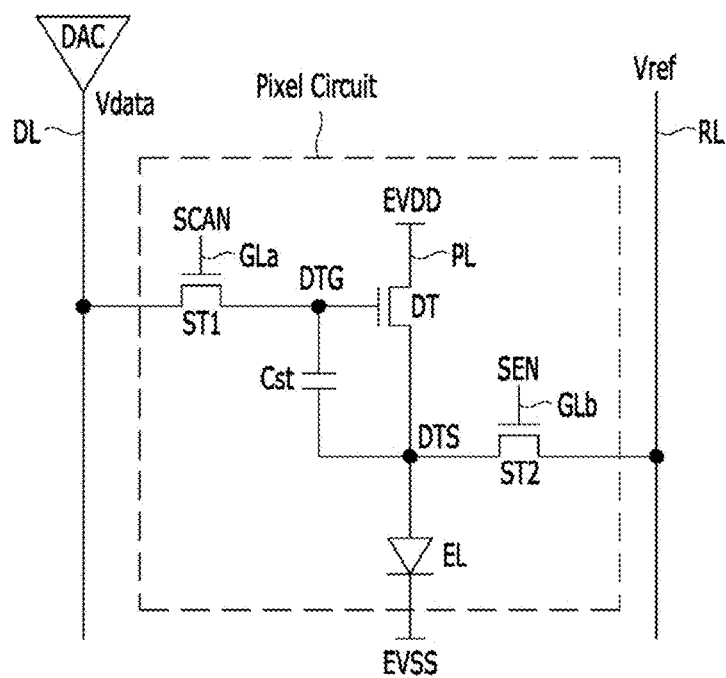

FIGS. 4 and 5 are diagrams illustrating an example of a pixel circuit included in the display apparatus 10.

Referring to FIGS. 4 and 5, a plurality of pixels each including a pixel circuit may be included in a pixel array of the display apparatus 10. The pixels may include red (R) pixels for displaying red, white (W) pixels for displaying white, green (G) pixels for displaying green, and blue (B) pixels for displaying blue. R/W/G/B pixels may include substantially the same pixel, except a light emitting device.

Signal lines connected to an R/W/G/B pixel circuit may be included in the pixel array of the display apparatus 10. The signal lines may include data lines DL for supplying data voltages Vdata to the R/W/G/B pixel circuits, gate lines GLa and GLb for supplying gate signals SCAN and SEN to the R/W/G/B pixel circuits, reference voltage lines RL for supplying a reference voltage Vref to the R/W/G/B pixel circuits, and high level power lines PL for supplying a high level driving voltage EVDD to the R/W/G/B pixel circuits. To enhance an aperture ratio of a pixel, the R/W/G/B pixel circuits may be designed to share one reference voltage line RL. In one or more examples, each data line DL may supply a data voltage Vdata to one or more respective pixels (or to one or more respective pixel circuits), each set of gate lines GLa and GLb may supply gate signals SCAN and SEN to one or more respective pixels (or to one or more respective pixel circuits), each reference voltage line RL may supply a reference voltage Vref to one or more respective pixels (or to one or more respective pixel circuits), and each high level power line PL may supply a high level driving voltage EVDD to one or more respective pixels (or to one or more respective pixel circuits).

The display apparatus 10 may include a panel driving circuit for driving the pixel array.

The panel driving circuit may include a timing controller for controlling an operation timing of each circuit and a display driving circuit, in addition to the touch sensing circuit 320 described above with reference to FIG. 2.

The display driving circuit may include a data driving circuit which drives the data lines DL and a gate driving circuit which drives the gate lines GLa and GLb.

The data driving circuit may output data voltages Vdata, corresponding to gray levels of input image data (or input image or image data), to the data lines DL. A digital-to-analog converter (DAC) included in the data driving circuit may convert the input image data, input from the timing controller, into an analog gamma compensation voltage to output the data voltage Vdata. The data driving circuit and the touch sensing circuit 320 may be integrated into one integrated circuit.

The gate driving circuit may sequentially supply a first gate signal SCAN, synchronized with the data voltage Vdata, to first gate lines GLa to select, by horizontal line units, pixels into which the data voltages Vdata are charged. The gate driving circuit may sequentially supply a second gate signal SEN, synchronized with the reference voltage Vref, to second gate lines GLb to select, by horizontal line units, pixels into which the reference voltage Vref is charged. The gate driving circuit may be disposed on a substrate of the display panel along with the pixels.

The timing controller may generate a display synchronization signal for display driving and a touch synchronization signal for touch driving, based on timing synchronization signals input from a host system. Based on the display synchronization signal and the touch synchronization signal, the timing controller may temporally divide one frame into a display driving period and a touch driving period.

The host system may transmit video data and the timing synchronization signals to the timing controller and may execute an application program associated with touch coordinate information input from the touch sensing circuit 320.

Referring to FIG. 5, the pixel circuit may include a light emitting device EL, a driving transistor DT, a storage capacitor Cst, a first switch transistor ST1, and a second switch transistor ST2. The transistors DT, ST1, and ST2 may each be implemented as a thin film transistor (TFT). Each of the TFTs may be implemented as a P type, an N type, or a hybrid type where the P type and the N type are combined. Further, a semiconductor layer of each TFT may include amorphous silicon, poly-silicon, or oxide.

The light emitting device EL may include an anode electrode connected to a source node DTS, a cathode electrode connected to an input terminal of a low level driving voltage EVSS, and an organic compound layer disposed between the anode electrode and the cathode electrode. The organic compound layer may include a hole injection layer (HIL), a hole transport layer (HTL), an emission layer (EML), an electron transport layer (ETL), and an electron injection layer (EIL).

The driving transistor DT may be a driving element which controls a level of a drain-source current (which may be referred to as Ids) of the driving transistor DT input to the light emitting device EL, based on a gate-source voltage (which may be referred to as Vgs) thereof. The driving transistor DT may include a gate electrode connected to a gate node DTG, a drain electrode connected to an input terminal of the high level driving voltage EVDD, and a source electrode connected to the source node DTS.

The storage capacitor Cst may be connected between the gate node DTG and the source node DTS and may hold the Vgs of the driving transistor DT during a predetermine period.

The first switch transistor ST1 may electrically connect the data line DL to the gate node DTG, based on the first gate signal SCAN from the first gate line GLa, and may allow the data voltage Vdata to be charged into the gate node DTG. The first switch transistor ST1 may include a gate electrode connected to the first gate line GLa, a drain electrode connected to the data line DL, and a source electrode connected to the gate node DTG.

The second switch transistor ST2 may electrically connect the source node DTS to the reference voltage line RL, based on the second gate signal SEN from the second gate line GLb, and may allow the reference voltage Vref to be charged into the source node DTS. The second switch transistor ST2 may include a gate electrode connected to the second gate line GLb, a drain electrode connected to the reference voltage line RL, and a source electrode connected to the source node DTS.

Figure 6:
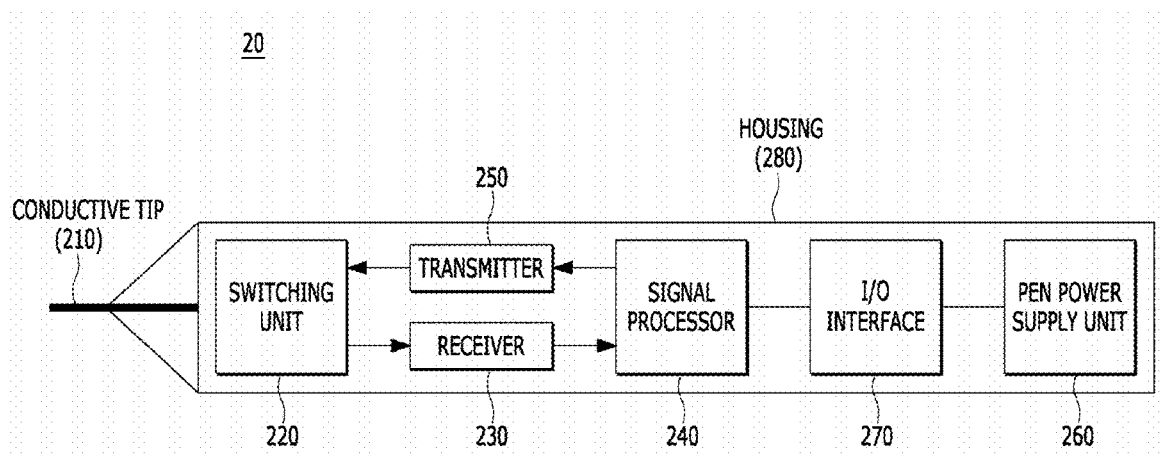
FIG. 6 is a diagram illustrating an example of a configuration of a stylus pen.

FIG. 6 is a diagram illustrating an example of a configuration of the stylus pen 20.

Referring to FIG. 6, the stylus pen 20 may include a housing 280, a conductive tip 210 which protrudes to the outside from one side of the housing 280, a switching unit 220 connected to the conductive tip 210 in the housing 280, a receiver 230 which receives the pen uplink signal input from the conductive tip 210 through the switching unit 220, a signal processor 240 which generates the pen downlink signal including the pen additional information on the basis of the pen uplink signal from the receiver 230, a transmitter 250 which level-shifts the pen downlink signal, generated by the signal processor 240, to an analog level and transfers a level-shifted pen downlink signal to the conductive tip 210 through the switching unit 220, a pen power supply unit 260 which generates a driving power needed for a pen operation, and an input/output (I/O) interface 270.

The conductive tip 210 may include a conductive material such as metal and may perform a function of a reception electrode and a function of a transfer electrode. When the conductive tip 210 contacts a screen of the display apparatus 10, the conductive tip 210 may be coupled to the display apparatus 10 at a contact point thereof. The conductive tip 210 may be a reception electrode of the stylus pen 20 for receiving the pen uplink signal radiated from the display apparatus 10. Furthermore, the conductive tip 210 may be a transfer electrode of the stylus pen 20 which radiates the pen downlink signal to the display apparatus 10.

The switching unit 220 may electrically connect the conductive tip 210 to the receiver 230 during a reception time for receiving the pen uplink signal and may electrically connect the transmitter 250 to the conductive tip 210 during a transfer time for transferring the pen downlink signal, and thus, may divide a transfer/reception time. Because the conductive tip 210 performs the function of the reception electrode and the function of the transmitter, a structure of the stylus pen 20 may be simplified.

The receiver 230 may include one or more amplifiers and may amplify the pen uplink signal. The receiver 230 may include a comparator and may compare an amplified signal with a predetermined reference voltage to output a comparison result to the signal processor 240.

The signal processor 240 may generate the pen downlink signal and may output the generated pen downlink signal to the transmitter 250, based on the pen uplink signal input from the receiver 230.

The transmitter 250 may include a level shifter and may shift the pen downlink signal having a digital level to an analog level. The transmitter 250 may output a level-shifted pen downlink signal to the conductive tip 210 through the switching unit 220.

The I/O interface 270 may be connected to the pen power supply unit 260 and may transfer a power needed for the receiver 230, the signal processor 240, and the transmitter 250.

Figure 7:
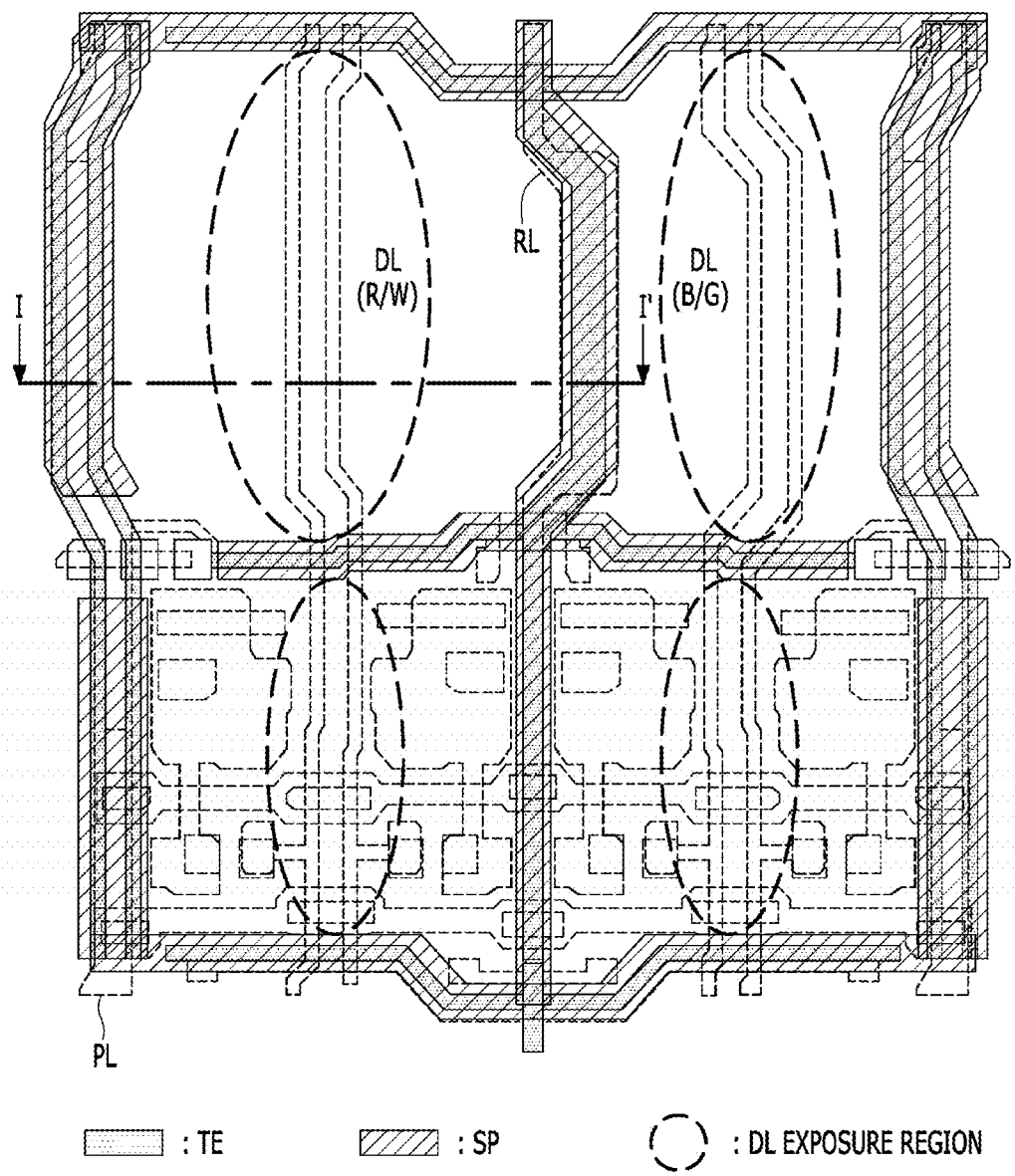
FIG. 7 is a first example embodiment of a pixel array configuration of a touch sensing-enabled display apparatus.
Figure 8:
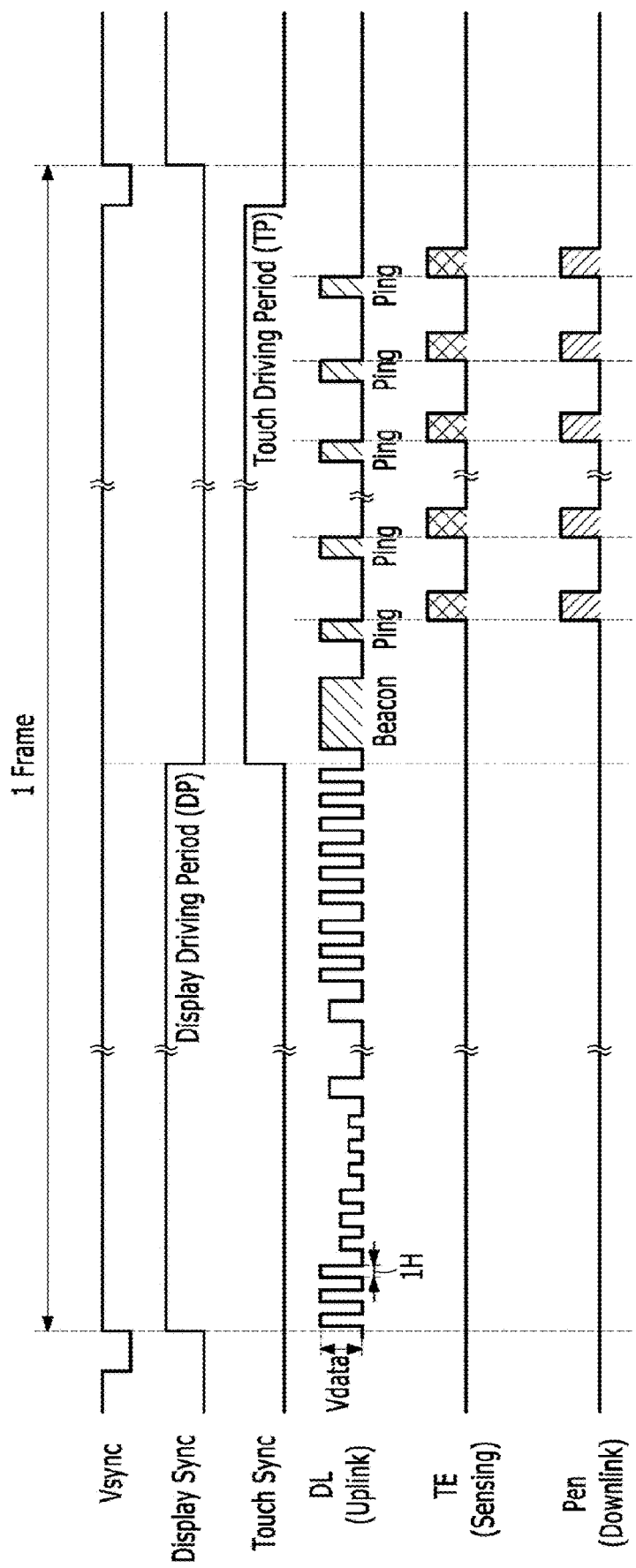
FIG. 8 is a diagram showing a touch driving waveform of a time division mode, based on a panel array configuration according to a first example embodiment.
Figure 9:
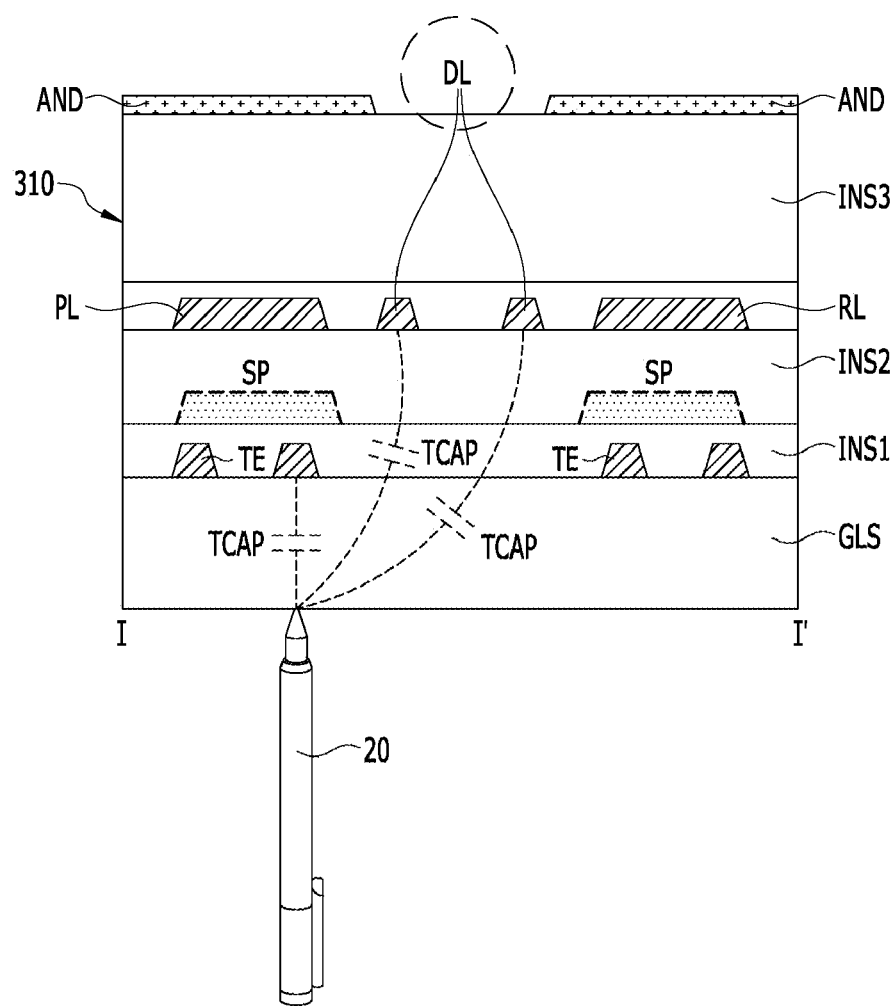
FIG. 9 is an example of a cross-sectional view of a panel array taken along line I-I' of FIG. 7.
Figure 10:
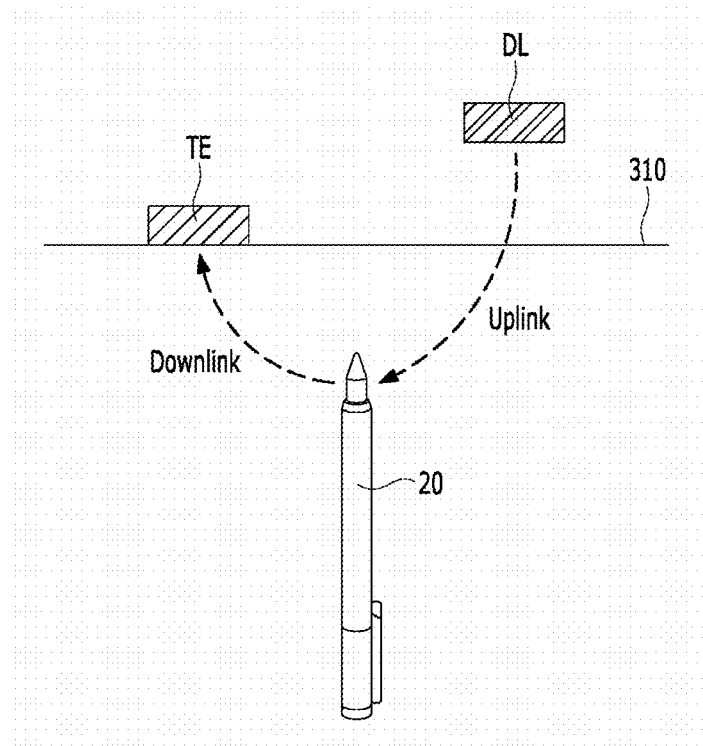
FIG. 10 is a diagram illustrating an example where a pen uplink signal is radiated from a data line to a stylus pen and a pen downlink signal is radiated from the stylus pen to a touch electrode during a touch driving period.

FIG. 7 is a first example embodiment of a pixel array configuration of a touch sensing-enabled display apparatus. FIG. 8 is a diagram showing a touch driving waveform of a time division mode, based on a panel array configuration according to a first example embodiment. FIG. 9 is an example of a cross-sectional view of a panel array taken along line I-I' of FIG. 7. FIG. 10 is a diagram illustrating an example where a pen uplink signal is radiated from a data line to a stylus pen and a pen downlink signal is radiated from the stylus pen to a touch electrode during a touch driving period.

Referring to FIGS. 7 and 9, in the display panel, compared to data lines DL, touch electrodes TE may be disposed closer to a substrate GLS, and shield electrodes SP may be disposed on the touch electrodes TE to overlap the touch electrodes TE. The shield electrodes SP may perform a function of preventing display noise from penetrating into the touch electrodes TE from the signal lines DL, RL, and PL for display driving.

However, because the shield electrodes SP overlap high level power lines PL and reference voltage lines RL, a parasitic capacitance applied to the shield electrodes SP may be large. The parasitic capacitance may largely occur between the shield electrodes SP and the touch electrodes TE. When the parasitic capacitance is large, an RC delay may increase. Accordingly, in one or more aspects, a present example embodiment does not use the touch electrodes TE as radiation electrodes for radiating the pen uplink signal, based on an RC delay.

The present example embodiment may use the data lines DL, where an overlap area with the shield electrodes SP is relatively small, of the signal lines DL, RL, and PL for display driving as radiation electrodes. In one or more aspects, the data lines DL may be disposed on the shield electrodes SP with a second insulation layer INS2 between the data lines DL and the shield electrodes SP, but at least some of the data lines DL do not overlap the shield electrodes SP (for example, most of the data lines DL do not overlap the shield electrodes SP), and thus, an adverse effect of a parasitic capacitance on the data lines DL may be small. In one or more aspects, at least some of the data lines DL do not overlap the touch electrodes TE (for example, most of the data lines DL do not overlap the touch electrodes TE), and thus, an adverse effect of a parasitic capacitance on the data lines DL may be small. In FIG. 7, a "DL exposure region" may denote a region where data lines DL which do not overlap the shield electrodes SP are disposed.

A touch driving waveform of a time division mode for using the data lines DL as radiation electrodes is shown in FIG. 8. Referring to FIG. 8, the timing controller may temporally divide one frame of an input image into a display driving period DP for displaying an input image and a touch driving period TP for driving touch electrodes, based on the display synchronization signal and the touch synchronization signal. The display synchronization signal and the touch synchronization signal may be generated by the timing controller with respect to a vertical synchronization signal Vsync. The display synchronization signal and the touch synchronization signal may be provided as one signal.

Each output channel of the data driving circuit may output a data voltage Vdata, varying at a period of one horizontal period 1H, to the data line DL during the display driving period DP.

The touch sensing circuit may perform control so that the pen uplink signal is radiated to the stylus pen using (or via or from) the data lines DL during the touch driving period DP. The pen uplink signal may include a beacon signal and a ping signal, which are based on pulse width modulation (PWM). The beacon signal may be output once during the touch driving period TP of one frame, and the ping signal may be output a plurality of times during the touch driving period TP of one frame. The ping signal may be output subsequently to the beacon signal.

The stylus pen, as in FIGS. 9 and 10, may receive the pen uplink signal radiated using (or via or from) the data lines DL during the touch driving period TP and may radiate the pen downlink signals, which are based on PWM and rise in synchronization with falling edges of the ping signal, to touch electrodes of pen contact points. The stylus pen may receive the radiated pen uplink signal through (or via) a coupling capacitor TCAP and may radiate the pen downlink signal to the touch electrodes through (or via) the coupling capacitor TCAP. Therefore, the touch sensing circuit may sense voltages of the touch electrodes based on the pen downlink signal.

A cross-sectional structure of the panel array is described in more detail with reference to FIG. 9.

The touch electrodes TE patterned (or formed) by using an opaque conductive material may be disposed on the substrate GLS. A first insulation layer INS1 may be disposed on the touch electrodes TE, and the shield electrodes SP patterned (or formed) by using an opaque conductive material may be formed at positions overlapping the touch electrodes TE, on the first insulation layer INS1. A second insulation layer INS2 may be disposed on the shield electrodes SP. The signal lines DL, RL, and PL for display driving, patterned (or formed) by using the same conductive material, may be disposed on the second insulation layer INS2. In one or more aspects, the high level power line PL and the reference voltage line RL may overlap the shield electrodes SP, but the data line DL do not overlap the shield electrodes SP. The signal lines DL, RL, and PL for display driving may be disposed on the same layer, and thus, a manufacturing mask process may be simplified.

One or more third insulation layers INS3 may be disposed on the signal lines DL, RL, and PL for display driving, and an anode electrode AND patterned (or formed) by using a transparent conductive material may be disposed on the third insulation layer INS3.

Figure 11:
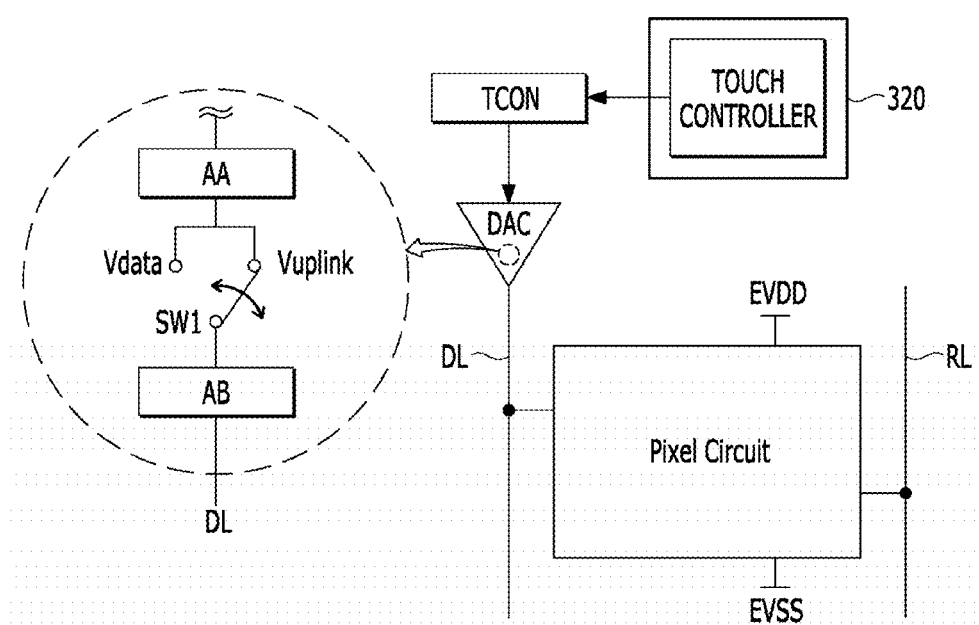
FIG. 11 is a diagram illustrating an example of an overall circuit configuration for outputting a pen uplink signal to a data line during a touch driving period.

FIG. 11 is a diagram illustrating an example of an overall circuit configuration for outputting a pen uplink signal to a data line during a touch driving period.

Referring to FIG. 11, a touch controller included in a touch sensing circuit 320 may communicate with a timing controller TCON through (or via or using) an internal interface circuit. The timing controller TCON may generate packet data corresponding to a pen uplink signal in response to a request signal input from the touch controller during a touch driving period and may transfer the packet data to a data driving circuit through (or via or using) the internal interface circuit. A digital-to-analog converter DAC of the data driving circuit may output a data voltage Vdata corresponding to image data to a data line DL during a display driving period and may output a pen uplink signal Vuplink corresponding to the packet data to the data line DL during the touch driving period.

The digital-to-analog converter DAC may include a signal generating circuit AA which generates the data voltage Vdata and the pen uplink signal Vuplink, a signal output circuit AB which selectively outputs the data voltage Vdata and the pen uplink signal Vuplink to the data line DL, and a first switch circuit SW1.

The first switch circuit SW1 may transfer the data voltage Vdata, generated by the signal generating circuit AA, to the signal output circuit AB during the display driving period and may transfer the pen uplink signal Vuplink, generated by the signal generating circuit AA, to the signal output circuit AB during the touch driving period. The first switch circuit SW1 may thus couple the signal generating circuit AA to the signal output circuit AB.

Figure 12:
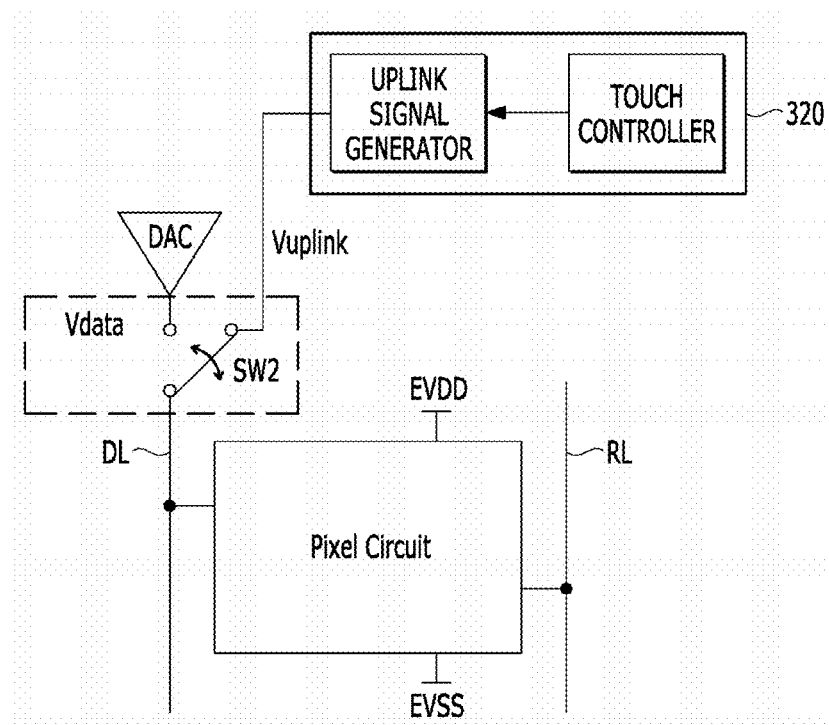
FIG. 12 is a diagram illustrating another example of an overall circuit configuration for outputting a pen uplink signal to a data line during a touch driving period.

FIG. 12 is a diagram illustrating another example of an overall circuit configuration for outputting a pen uplink signal to a data line during a touch driving period.

Referring to FIG. 12, the touch sensing circuit 320 may further include an uplink signal generator, in addition to the touch controller. During the touch driving period, the uplink signal generator may generate a pen uplink signal Vuplink in response to a request signal input from the touch controller and may output the pen uplink signal Vuplink to the data line DL through (via or using) a second switch circuit SW2.

The digital-to-analog converter DAC of the data driving circuit may generate and output a data voltage Vdata, corresponding to image data, to the data line DL through (via or using) the second switch circuit SW2 during the display driving period.

The second switch circuit SW2 may transfer an output of the digital-to-analog converter DAC to the data line DL during the display driving period and may transfer an output of the uplink signal generator to the data line DL during the touch driving period.

The first example embodiment described above with reference to FIGS. 7 to 12 may use the data lines DL as radiation electrodes of the pen uplink signal Vuplink. Because the data lines DL are driven by individual line units in the data driving circuit, an RC load may be less than the touch electrodes. Accordingly, a waveform distortion caused by an RC delay may be considerably reduced when the pen uplink signal is radiated.

Because the data lines DL do not overlap the touch electrodes TE arranged in a mesh form as shown in FIG. 7 and do not overlap the shield electrodes SP covering the touch electrodes TE, the signal distortion of the pen uplink signal Vuplink may be minimized despite radiation of the pen uplink signal Vuplink.

Figure 13:
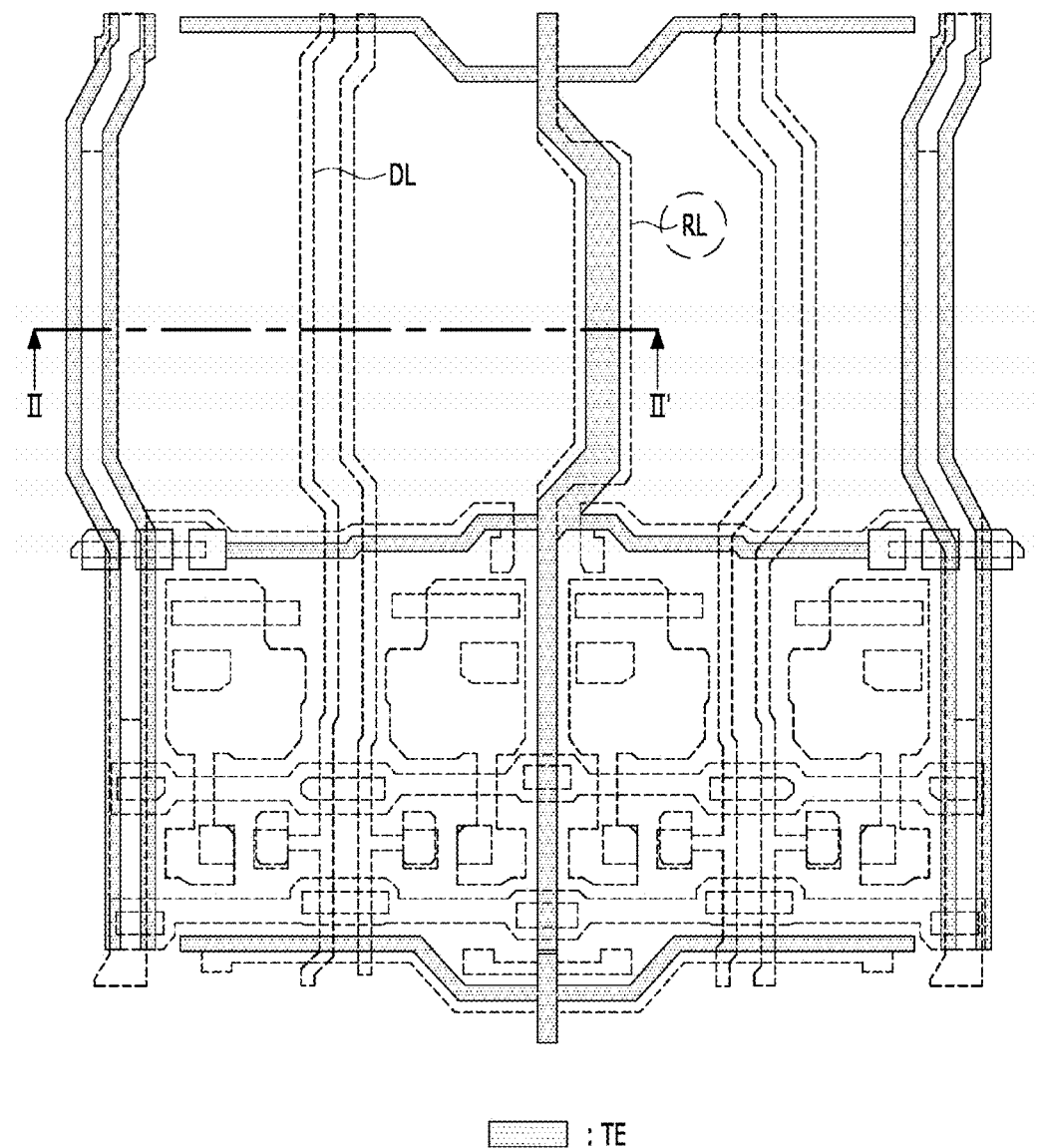
FIG. 13 is a second example embodiment of a pixel array configuration of a touch sensing-enabled display apparatus.
Figure 14:
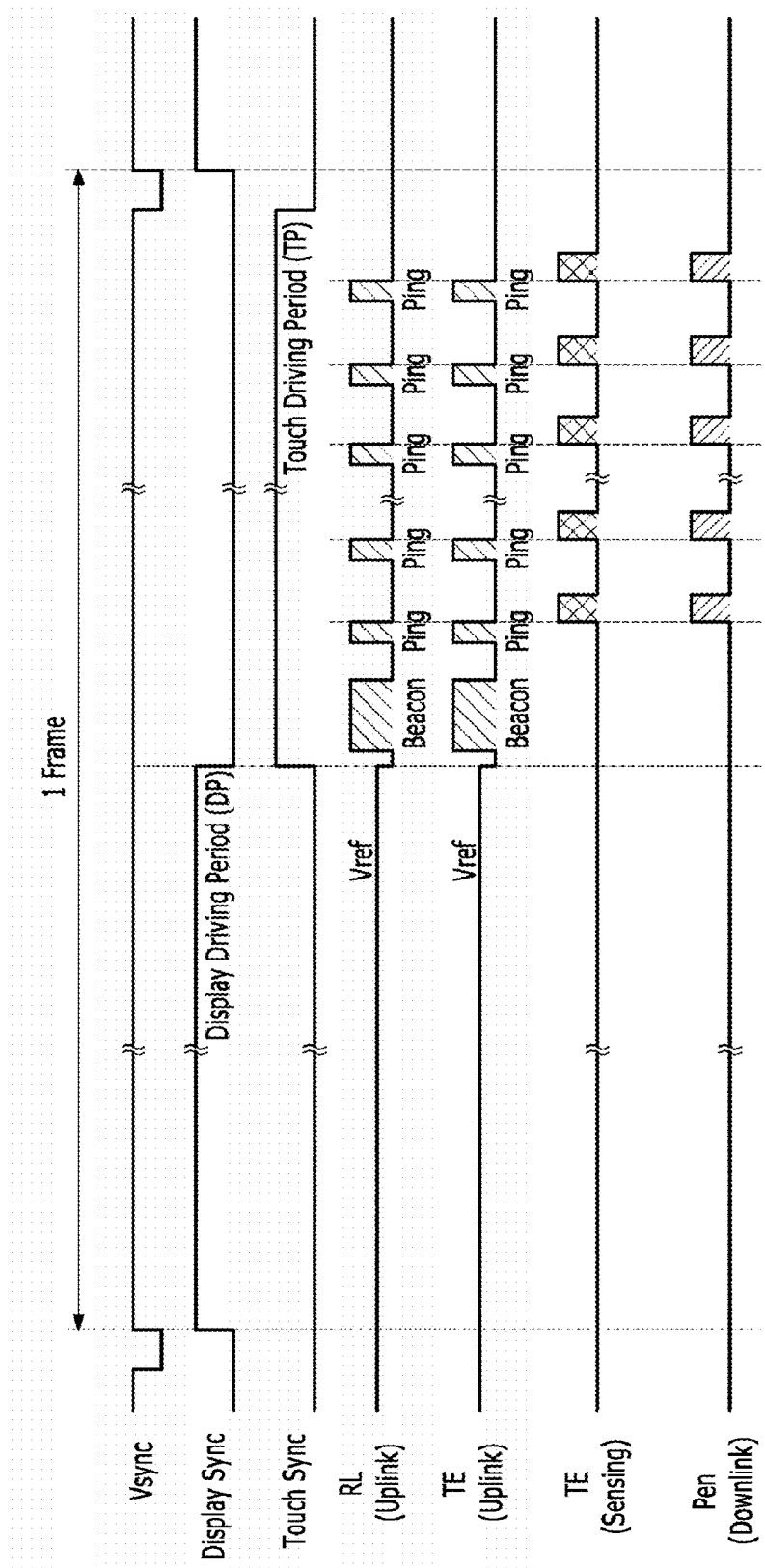
FIG. 14 is a diagram showing a touch driving waveform of a time division mode, based on a panel array configuration according to a second example embodiment.
Figure 15:
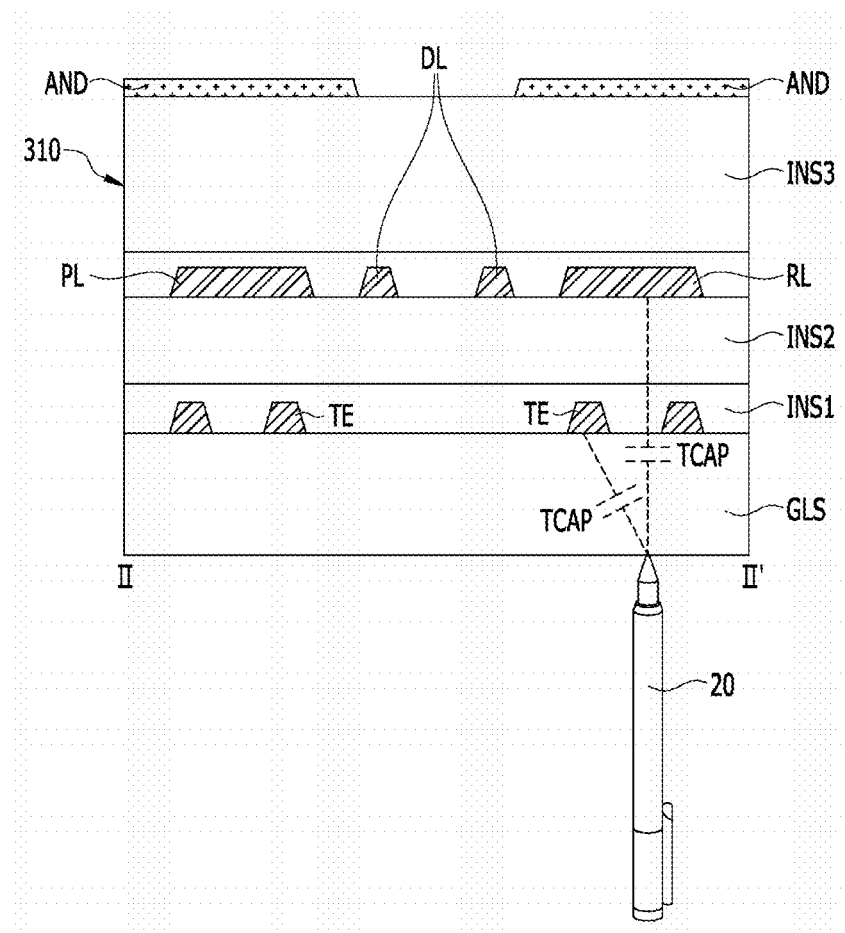
FIG. 15 is an example of a cross-sectional view of a panel array taken along line II-II' of FIG. 13.
Figure 16:
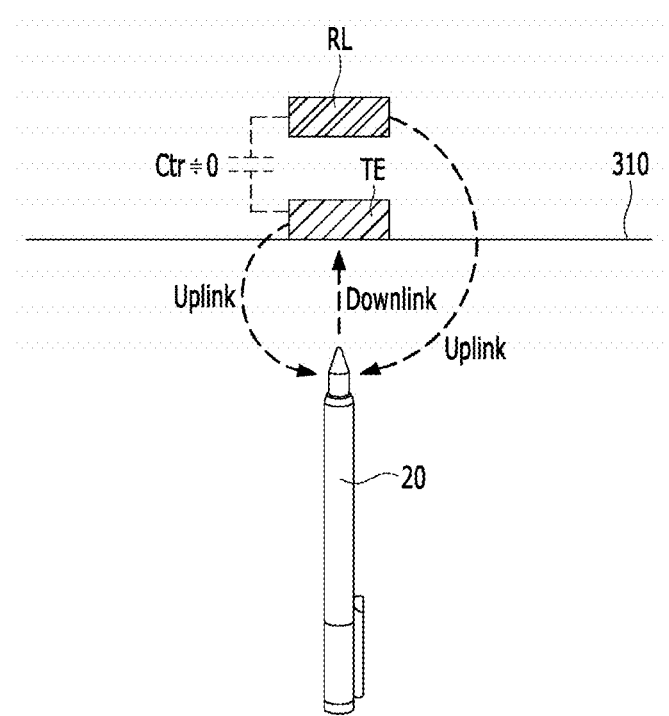
FIG. 16 is a diagram illustrating an example where a pen uplink signal is radiated from a reference voltage line and a touch electrode to a stylus pen and a pen downlink signal is radiated from the stylus pen to the touch electrode during a touch driving period.

FIG. 13 is a second example embodiment of a pixel array configuration of a touch sensing-enabled display apparatus. FIG. 14 is a diagram showing a touch driving waveform of a time division mode, based on a panel array configuration according to a second example embodiment. FIG. 15 is an example of a cross-sectional view of a panel array taken along line II-II' of FIG. 13. FIG. 16 is a diagram illustrating an example where a pen uplink signal is radiated from a reference voltage line and a touch electrode to a stylus pen and a pen downlink signal is radiated from the stylus pen to the touch electrode during a touch driving period.

Referring to FIGS. 13 and 15, in a display panel, touch electrodes TE may be disposed closer to a substrate GLS than reference voltage lines RL, the reference voltage lines RL may be disposed on the touch electrodes TE with insulation layers INS1 and INS2 therebetween, and at least some of the reference voltage lines RL may overlap the touch electrodes TE.

Unlike the first example embodiment, in one more aspects, the second example embodiment do not include shield electrodes SP, and thus, may use the touch electrodes TE and the reference voltage lines RL as radiation electrodes for simultaneously radiating a pen uplink signal. Because the touch electrodes TE and the reference voltage lines RL radiate the same pen uplink signal, a magnitude of a parasitic capacitance Ctr applied therebetween may be substantially zero as in FIG. 16. Accordingly, the degree of distortion of the pen uplink signal caused by an RC delay may be considerably reduced.

A touch driving waveform of a time division mode for using the touch electrodes TE and the reference voltage lines RL as radiation electrodes is shown in FIG. 14. Referring to FIG. 14, the timing controller may temporally divide one frame into a display driving period DP for displaying an input image and a touch driving period TP for driving touch electrodes, based on a display synchronization signal and a touch synchronization signal. The display synchronization signal and the touch synchronization signal may be generated by the timing controller with respect to a vertical synchronization signal Vsync. The display synchronization signal and the touch synchronization signal may be provided as one signal.

A reference voltage Vref may be supplied to the touch electrodes TE and the reference voltage lines RL during the display driving period DP, and the pen uplink signal may be supplied thereto during the touch driving period TP.

The touch sensing circuit may perform control so that the pen uplink signal is radiated to a stylus pen using (or via or from) the touch electrodes TE and the reference voltage lines RL during the touch driving period DP. The pen uplink signal may include a beacon signal and a ping signal, which are based on PWM. The beacon signal may be output once during the touch driving period TP of one frame, and the ping signal may be output a plurality of times during the touch driving period TP of one frame. The ping signal may be output subsequently to the beacon signal.

The stylus pen, as in FIGS. 15 and 16, may receive the pen uplink signal radiated using (or via or from) the touch electrodes TE and the reference voltage lines RL during the touch driving period TP and may radiate pen downlink signals, which are based on PWM and rise in synchronization with falling edges of the ping signal, to touch electrodes TE of pen contact points. The stylus pen may receive the radiated pen uplink signal through (or via or using) a coupling capacitor TCAP and may radiate the pen downlink signal to the touch electrodes TE through (or via or using) the coupling capacitor TCAP. Therefore, the touch sensing circuit may sense voltages of the touch electrodes based on the pen downlink signal.

A cross-sectional structure of the panel array is described in more detail with reference to FIG. 15.

The touch electrodes TE patterned (or formed) by using an opaque conductive material may be disposed on the substrate GLS. First and second insulation layers INS1 and INS2 may be disposed on the touch electrodes TE, and the signal lines DL, RL, and PL for display driving, patterned (or formed) by using the same conductive material, may be disposed on the second insulation layer INS2. In one or more aspects, the high level power line PL and the reference voltage line RL may overlap the touch electrodes TE, but the data line DL do not overlap the touch electrodes TE. The signal lines DL, RL, and PL for display driving may be disposed on the same layer, and thus, a manufacturing mask process may be simplified.

One or more third insulation layers INS3 may be disposed on the signal lines DL, RL, and PL for display driving, and an anode electrode AND patterned (or formed) by using a transparent conductive material may be disposed on the third insulation layer INS3.

Figure 17:
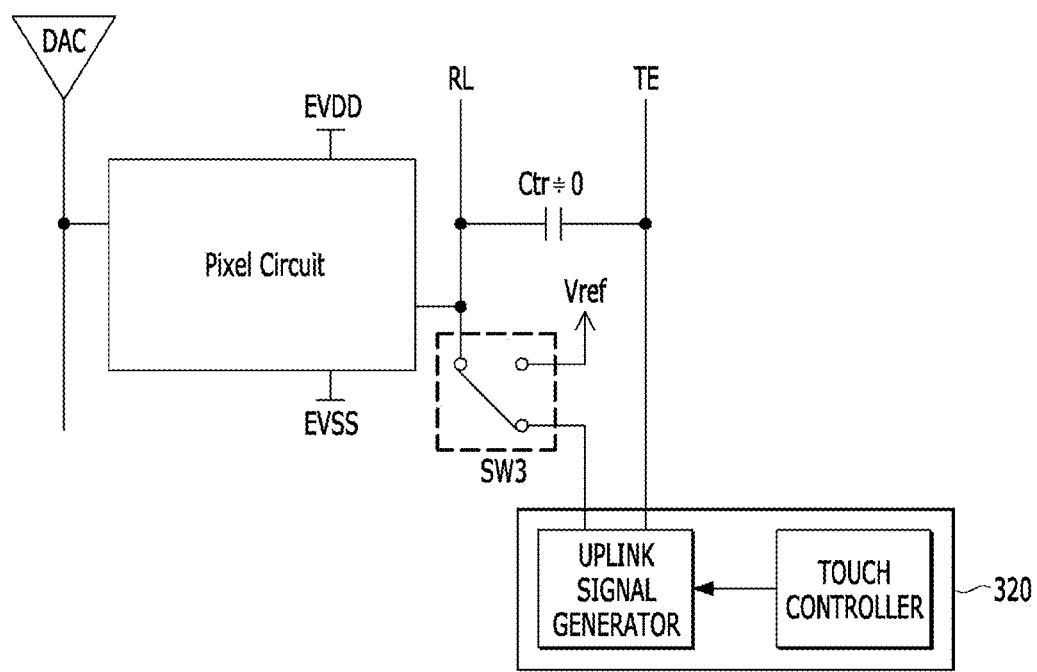
FIG. 17 is a diagram illustrating an example of an overall circuit configuration for outputting a pen uplink signal to a reference voltage line and a touch electrode during a touch driving period.

FIG. 17 is a diagram illustrating an example of an overall circuit configuration for outputting a pen uplink signal to a reference voltage line and a touch electrode during a touch driving period.

Referring to FIG. 17, a touch sensing circuit 320 may further include an uplink signal generator, in addition to a touch controller. The uplink signal generator may generate a pen uplink signal Vuplink in response to a request signal input from the touch controller during a touch driving period and may output the pen uplink signal Vuplink to a reference voltage line RL through (or via or using) a third switch circuit SW3. Furthermore, the uplink signal generator may output the pen uplink signal Vuplink to touch electrodes TE during a touch driving period.

The third switch circuit SW3 may connect the reference voltage lines RL to a reference voltage terminal for supplying a reference voltage Vref during the display driving period and may connect an output terminal of the uplink signal generator to the reference voltage lines RL during the touch driving period. The uplink signal generator is directly connected to touch electrodes TE without a switch.

The second example embodiment described above with reference to FIGS. 13 to 17 may use the touch electrodes TE and the reference voltage lines RL as radiation electrodes for the pen uplink signal Vuplink. Because the same pen uplink signal is radiated to the touch electrodes TE and the reference voltage lines RL during the touch driving period, a parasitic capacitance between the touch electrodes TE and the reference voltage lines RL may be considerably reduced, and thus, a waveform distortion caused by an RC delay may be considerably reduced when the pen uplink signal is radiated.

Figure 18:
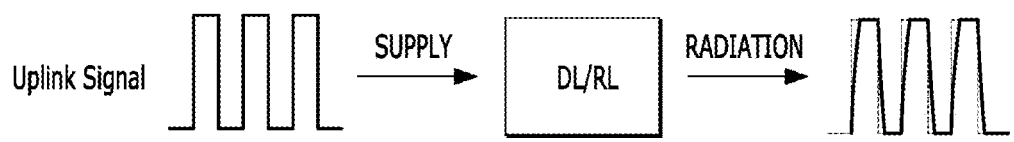
FIG. 18 is a diagram showing a radiation waveform of a pen uplink signal supplied to a data line or a reference voltage line according to the present one or more example embodiments.

FIG. 18 is a diagram showing a radiation waveform of a pen uplink signal supplied to a data line or a reference voltage line according to one or more example embodiments of the present disclosure.

Referring to FIG. 18, according to one or more example embodiments of the present disclosure, a radiation waveform of a pen uplink signal supplied to a data line DL or a reference voltage line RL may be substantially close to a square wave. According to one or more example embodiments of the present disclosure, pen touch performance may be enhanced to the degree to which a waveform distortion caused by an RC delay is considerably reduced when the pen uplink signal is radiated.

One or more example embodiments of the present disclosure may realize, among others, the following effect.

One or more example embodiments of the present disclosure may reduce the distortion of a pen uplink signal radiated from a display apparatus to a stylus pen, thereby enhancing pen touch performance.

The effects according to the present disclosure are not limited to the above examples, and other various effects may be realized and attained by the descriptions provided in the present disclosure, including the claims and the drawings.

While the present disclosure has been particularly shown and described with reference to one or more example embodiments thereof, it will be understood by those of ordinary skill in the art that various changes in form and details may be made therein without departing from the technical idea, spirit or scope of the present disclosure. Thus, the present disclosure covers the modifications and variations of this disclosure that come within the scope of the claims and their equivalents.

What is claimed is:

1. A touch sensing system, comprising:
    a display panel including:
        a plurality of pixels for displaying an input image;
        a plurality of data lines, wherein each of the plurality of data lines is configured to supply a respective one of the plurality of pixels with a data voltage corresponding to a gray level of the input image; and
        a plurality of touch electrodes disposed to overlap the plurality of pixels;
    a timing controller configured to divide one frame of the input image into a display driving period for displaying the input image and a touch driving period for driving at least one of the plurality of touch electrodes;
    a stylus pen configured to receive a pen uplink signal during the touch driving period and output a pen downlink signal synchronized with the pen uplink signal; and
    a touch sensing circuit configured to:
        perform control so that the pen uplink signal is radiated to the stylus pen using at least one of the plurality of data lines during the touch driving period; and
        sense at least one voltage of the at least one of the plurality of touch electrodes based on the pen downlink signal.

2. The touch sensing system of claim 1, wherein, at least some portions of the plurality of data lines do not overlap the plurality of touch electrodes.

3. The touch sensing system of claim 1, wherein, in a cross-sectional view of the display panel:
    the plurality of touch electrodes are disposed closer to a substrate than the plurality of data lines;
    at least some portions of a plurality of shield electrodes are disposed on at least some portions of the plurality of touch electrodes to overlap the at least some portions of the plurality of touch electrodes;
    at least some parts of the plurality of data lines are disposed on at least some parts of the plurality of shield electrodes with an insulation layer between the at least some parts of the plurality of data lines and the at least some parts of the plurality of shield electrodes; and
    at least some segments of the plurality of data lines do not overlap the plurality of shield electrodes.

4. The touch sensing system of claim 3, wherein at least some portions of the plurality of data lines do not overlap the plurality of touch electrodes.

5. The touch sensing system of claim 1, further comprising a digital-to-analog converter configured to output the data voltage to a corresponding data line of the plurality of data lines during the display driving period and output the pen uplink signal to the corresponding data line during the touch driving period.

6. The touch sensing system of claim 5, wherein the digital-to-analog converter comprises:
    a signal generating circuit configured to generate the data voltage and the pen uplink signal;
    a signal output circuit configured to selectively output the data voltage and the pen uplink signal to the corresponding data line; and
    a first switch circuit configured to couple the signal generating circuit to the signal output circuit,
    wherein during the display driving period, the first switch circuit is configured to transfer the data voltage, generated by the signal generating circuit, to the signal output circuit, and
    wherein during the touch driving period, the first switch circuit is configured to transfer the pen uplink signal, generated by the signal generating circuit, to the signal output circuit.

7. The touch sensing system of claim 1, further comprising:
    a digital-to-analog converter configured to generate the data voltage during the display driving period;
    an uplink signal generator configured to generate the pen uplink signal during the touch driving period; and
    a second switch circuit configured to transfer an output of the digital-to-analog converter to one of the plurality of data lines during the display driving period and transfer an output of the uplink signal generator to the one of the plurality of data lines during the touch driving period.

8. The touch sensing system of claim 7, wherein the uplink signal generator is included in the touch sensing circuit.

9. A touch sensing system, comprising:
- a display panel including:
  - a plurality of pixels for displaying an input image;
  - a plurality of data lines, wherein each of the plurality of data lines is configured to supply a respective one of the plurality of pixels with a data voltage corresponding to a gray level of the input image;
  - a plurality of reference voltage lines, wherein each of the plurality of reference voltage lines is configured to supply a reference voltage to one or more respective pixels of the plurality of pixels; and
  - a plurality of touch electrodes disposed to overlap the plurality of pixels;
- a timing controller configured to divide one frame of the input image into a display driving period for displaying the input image and a touch driving period for driving at least one of the plurality of touch electrodes;
- a stylus pen configured to receive a pen uplink signal during the touch driving period and output a pen downlink signal synchronized with the pen uplink signal; and
- a touch sensing circuit configured to:
  - supply the pen uplink signal, which is to be radiated to the stylus pen, using the at least one of the plurality of touch electrodes and at least one of the plurality of reference voltage lines during the touch driving period; and
  - sense at least one voltage of the at least one of the plurality of touch electrodes based on the pen downlink signal.

10. The touch sensing system of claim 9, wherein, in a cross-sectional view of the display panel:
- the plurality of touch electrodes are disposed closer to a substrate than the plurality of reference voltage lines;
- at least some parts of the plurality of reference voltage lines are disposed on at least some parts of the plurality of touch electrodes with an insulation layer between the at least some parts of the plurality of reference voltage lines and the at least some parts of the plurality of touch electrodes; and
- at least some portions of the plurality of reference voltage lines overlap at least some portions of the plurality of touch electrodes.

11. The touch sensing system of claim 9, further comprising:
- a reference voltage terminal configured to receive the reference voltage during the display driving period;
- an uplink signal generator configured to generate the pen uplink signal during the touch driving period; and
- a third switch circuit configured to couple the reference voltage terminal to the at least one of the plurality of reference voltage lines during the display driving period and couple an output terminal of the uplink signal generator to the at least one of the plurality of reference voltage lines during the touch driving period, wherein the uplink signal generator is directly connected to the at least one of the plurality of touch electrodes without a switch.

12. The touch sensing system of claim 11, wherein the uplink signal generator is included in the touch sensing circuit.

13. A driving method of a touch sensing system including a display panel, wherein the display panel includes a plurality of pixels, a plurality of data lines, and a plurality of touch electrodes, wherein the plurality of pixels are configured to display an input image, wherein each of the plurality of data lines is configured to supply a respective one of the plurality of pixels with a data voltage corresponding to a gray level of the input image, wherein the plurality of touch electrodes are disposed to overlap the plurality of pixels, and wherein the driving method comprises:
- dividing one frame of the input image into a display driving period for displaying the input image and a touch driving period for driving at least one of the plurality of touch electrodes;
- performing control by using a touch sensing circuit so that a pen uplink signal is radiated to a stylus pen from at least one of the plurality of data lines during the touch driving period;
- receiving the pen uplink signal by using the stylus pen during the touch driving period and outputting a pen downlink signal synchronized with the pen uplink signal; and
- sensing at least one voltage of the at least one of the plurality of touch electrodes based on the pen downlink signal by using the touch sensing circuit during the touch driving period.

14. The driving method of the touch sensing system of claim 13, wherein at least some portions of the plurality of data lines do not overlap the plurality of touch electrodes.

15. A driving method of a touch sensing system including a display panel, wherein the display panel includes a plurality of pixels, a plurality of data lines, a plurality of reference voltage lines, and a plurality of touch electrodes, wherein the plurality of pixels are configured to display an input image, wherein each of the plurality of data lines is configured to supply a respective one of the plurality of pixels with a data voltage corresponding to a gray level of the input image, wherein each of the plurality of reference voltage lines is configured to supply a reference voltage to one or more respective pixels of the plurality of pixels, wherein the plurality of touch electrodes are disposed to overlap the plurality of pixels, and wherein the driving method comprises:
- dividing one frame of the input image into a display driving period for displaying the input image and a touch driving period for driving at least one of the plurality of touch electrodes;
- supplying a pen uplink signal, which is to be radiated to a stylus pen, to the at least one of the plurality of touch electrodes and at least one of the plurality of reference voltage lines by using a touch sensing circuit during the touch driving period;
- receiving the pen uplink signal by using the stylus pen during the touch driving period and outputting a pen downlink signal synchronized with the pen uplink signal; and
- sensing at least one voltage of the at least one of the plurality of touch electrodes based on the pen downlink signal by using the touch sensing circuit during the touch driving period.

* * * * *